United States Patent [19]

Ruppert et al.

[11] Patent Number: 5,424,524
[45] Date of Patent: Jun. 13, 1995

[54] PERSONAL SCANNER/COMPUTER FOR DISPLAYING SHOPPING LISTS AND SCANNING BARCODES TO AID SHOPPERS

[76] Inventors: Jonathan P. Ruppert, 17147 Heatherwood Way, Morgan Hill, Calif. 95037; Ronald C. Fish, 16590 Oak View Cir., Morgan Hill, Calif. 95037

[21] Appl. No.: 82,257

[22] Filed: Jun. 24, 1993

[51] Int. Cl.⁶ .................. G06K 7/10; G06K 15/00
[52] U.S. Cl. .................. 235/462; 235/383; 364/402; 364/709.02
[58] Field of Search .............. 235/383, 462; 364/401, 364/402, 403, 709.02, 710.02

[56] References Cited

U.S. PATENT DOCUMENTS

| | | | |
|---|---|---|---|
| 3,983,573 | 9/1976 | Ishihara | 357/24 |
| 4,071,740 | 1/1978 | Gogulski | 235/431 |
| 4,973,952 | 11/1990 | Malec et al. | 34/825 |
| 5,187,354 | 2/1993 | Bengtsson | 235/472 |
| 5,221,838 | 1/1993 | Gutman | 235/379 |
| 5,250,789 | 10/1993 | Johnsen | 235/383 |

FOREIGN PATENT DOCUMENTS 9002296 5/1992 Netherlands.

OTHER PUBLICATIONS

"Model BHC5532 Bar Code Reader", Densei, Nippon Electric Industry Co., Ltd.
"NPD Neilsen Reshapes The Future of Home-Based Market Research ", Real–Times, vol. 3, Nov. 2, 1991 p. 1.
"PTCs Speed POS Conversions At Woolworth Corporation", Real–Times, vol. 3, No. 2, 1991 p. 6.
"Telxon Touch–Screen Technology Captures Customers' Approval", Real–Times, vol. 3, No. 2, 1991 p. 6.
"Device may let supermarkets bag checkout lines", San Jose Mercury News, Business, Oct. 12, 1993 p. 1.
"Check it our–yourself", San Francisco Examiner, Sunday Jan. 10, 1993, p. E–16.
"Point of Sale; POS hardware wizardry comes to market", Automatic I.D. News, Jan. 1994, p. 50.

Primary Examiner—Donald Hajec
Assistant Examiner—Karl D. Frech
Attorney, Agent, or Firm—Ronald Craig Fish; Falk, Vestal & Fish

[57] ABSTRACT

A personal bar code scanning device for aiding shoppers in keeping track of their expenditures and speeding the process of check-out and taking advantage of coupons. A microprocessor coupled to a bar code reader, a communication port, an audible feedback device and a touchscreen or light pen and display combination carrys out bar code scanning in a store as a shopper shops. The user selects a shopping list from a collection of one or more shopping lists or creates a new list from a database or by spelling out the items to purchase on a keyboard. The user then downloads the store's current price list by modem or by connecting to the store computer when the store is entered. When the shopper wishes to purchase an item, the personal bar code scanning device is placed adjacent to the bar code on the package of the item and the user presses a button to scan the bar code. The bar code is then imaged by a CCD device, and the pattern of light and dark bars is decoded into an ASCII string which is stored in memory and compared to the current shopping list and the current price list. When a match is found, the display is changed to indicate the item scanned has been put in the basket. The price of the item is then added to the running total. In some embodiments, when the price list is downloaded, there is automatically downloaded a coupon list of items currently on sale. When an item is scanned, the ASCII identification string is compared to the coupon list, and, if a match is found, the discount from the coupon is automatically applied before updating the running total. In some embodiments, a magnetic security strip is used next to the bar code. The personal bar code scanner includes a pair of permanent magnets or electromagnets to generate a D.C. or nonvarying magnetic field which can envelope the magnetic security strip to deactivate it when an item has been scanned. This prevents the item from setting off security alarms when passing a security device at a store exit. In some embodiments, the Personal Scanner TM device is mounted on a shopping cart for use by user's who do not own their own devices.

22 Claims, 11 Drawing Sheets

PERSONAL SCANNER/COMPUTER FOR DISPLAYING SHOPPING LISTS AND SCANNING BARCODES TO AID SHOPPERS

BACKGROUND OF THE INVENTION

The invention pertains to the field of digital scanning, computing, data collection and data processing devices. More precisely, the invention pertains to the field of devices for assisting shoppers in creating shopping lists, scanning bar codes on products to be purchased etc., keeping running totals of amounts spent and items from shopping lists that have been picked up and numerous other useful functions.

One of the problems with shopping today is that it is inconvenient to constantly make comprehensive shopping lists every time a shopping trip is to be made, and, without a shopping list, it is often difficult to remember all the items that need to be purchased. Also, it is difficult to know how much money is being spent compared to a budgeted amount as items are placed in a shopping basket. During crowded shopping times, checkout times at grocery stores for example can be long especially when the shoppers ahead in line have many items.

It is also inconvenient to do comparison shopping for large numbers of items either for the same store over time or as between multiple stores at the same time. A study of changes in prices over time in a favorite store would require the user to write down the prices of large numbers of items and date the lists and keep them and then write down the current prices for the same items, preferably in the same order as the previous lists and compare the lists. Likewise, a comparison of prices between different stores would require physically visiting the different stores and writing down the prices of many items in each store, preferably in the same order in each store.

Further, with the multitude of sources of coupons for discounts on items on sale, it is a time consuming and tedious process to scan the local newspapers etc. for coupons, cut them out and bring them to the store that published the coupons to take advantage of the savings offered thereby.

Therefore, a need has arisen for a device that can ease or eliminate the foregoing problems.

SUMMARY OF THE INVENTION

In accordance with the teachings of the invention, there is disclosed a personal bar code scanning device which comprises a microprocessor and associated control software coupled to a bar code reader, a display, and a bidirectional communication port/device, ROM or EPROM memory and random access memory. Preferably, the display comprises a touchscreen and the communication device is a modem or an infrared transceiver or infrared red transceiver local area network interface. The bar code reading device is preferably a charge coupled device type reader which can image a bar code even on a curved surface and which has a built in decoder for converting the light and dark patterns of the bar code to an ASCII string of characters encoded in the bar code. In some embodiments, the Personal Scanner TM device will be implemented in the form of a palmtop computer with a keyboard, touchscreen and associated internal modem or infrared transceiver local area network interface.

In one embodiment, the control software includes routines for displaying the list of stored shopping lists, modifying a selected shopping list by adding or deleting items, or generating custom shopping lists starting from nil list. Other routines retrieve the current price list of the store to be shopped. This may be done by modem in some embodiments, or by physical connection to the store computer in other embodiments through the communication port. In other embodiments, the current price list can be downloaded by way of an infrared transceiver local area network interface when the user enters the store and indicates that the price list is to be downloaded. Another routine receives user input indicating when an item is to be scanned, and sends a command to the bar code scanner to cause the bar code to be scanned. The resulting ASCII string from the decoder in the bar code scanner is received and displayed and compared to the items on the currently selected shopping list. In some embodiments, fuzzy logic is used to display all possible matches where the prose used to describe the item on the shopping list does not exactly match the text used in the bar code to describe the item scanned. Another routine alters the display of the item scanned to indicate that it has been scanned and then looks up the item on the current price list and adds its price to a running total which is displayed to the user. Another routine allows the user to enter a desired budget expenditure number as a guide in some embodiments.

When the user indicates by a signal such as touching a particular part of the touchscreen that he or she is done shopping, any item on the shopping list which has not been scanned is blinked or otherwise indicated on the display to remind the user to locate and scan such an item for purchase prevent forgotten items.

After all desired items have been scanned, the stored descriptive information and price information are downloaded from the personal bar code scanner to the store computer either through a hardwired connection between the communication port of the Personal Scanner TM device and a communication port of the store computer or through an infrared transceiver local area network interface.

In alternative embodiments, when the user downloads a price list, a list of current discount coupons is also downloaded with the price list. This saves the cost to the stores of publishing the coupons and simplifies the life of the user. When the user enters the store and scans an item, the description of the item is used to automatically scan not only the shopping list and price list but also the current coupon list to determine if any discounts apply. If a discount coupon matching the scanned item is found, the discount is automatically applied to the price of the item before the running total is updated.

In the preferred embodiment, the price list is data compressed using known compression algorithms used in FAX machines prior to transmission to the Personal Scanner TM device and is stored in compressed form. The list can be decompressed in the Personal Scanner TM device prior to use in updating the running total as each item is scanned or during the processing to match a scanned item to items on the shopping list.

In the preferred embodiment, a credit card facility is provided whereby the user can enter credit card information needed for a purchase for one or more credit cards in the Personal Scanner TM device or can change credit card information already stored. After all shopping is completed, the user may select one of the stored credit cards to use by touching its entry on a displayed list on a touchscreen. The card information for the selected card is then downloaded to the store computer for use in paying for the purchase.

In an alternative embodiment, the Personal Scanner TM device may be used to shop for real estate. In this embodiment, signs in front of houses for sale will have bar codes thereon which give the house ID. The user scans the bar codes of all houses in the neighborhoods that appeal to the user or which he or she can afford, and the bar codes are stored. The scanned bar code information includes not only the house identification (usually its street address) but also the phone number of a real estate network computer which stores the details of the listing. Later, the user uses an internal or external modem to dial the computer associated with each listing by touching the identification of a particular listing on the touchscreen of the Personal Scanner TM device or by using a lightpen, keyboard etc. The computer storing the details of the listing is then dialed, and the record for the listing of interest is downloaded into the Personal Scanner TM device and displayed so that the user can determine details of interest such as the square footage, number of bedrooms and bathrooms, amenities etc.

In some embodiments optimized for grocery shopping, the Personal Scanner TM device is mounted on a shopping cart for use by user's who do not own their own devices.

DETAILED DESCRIPTION OF THE PREFERRED EMBODIMENT

Figure 1:
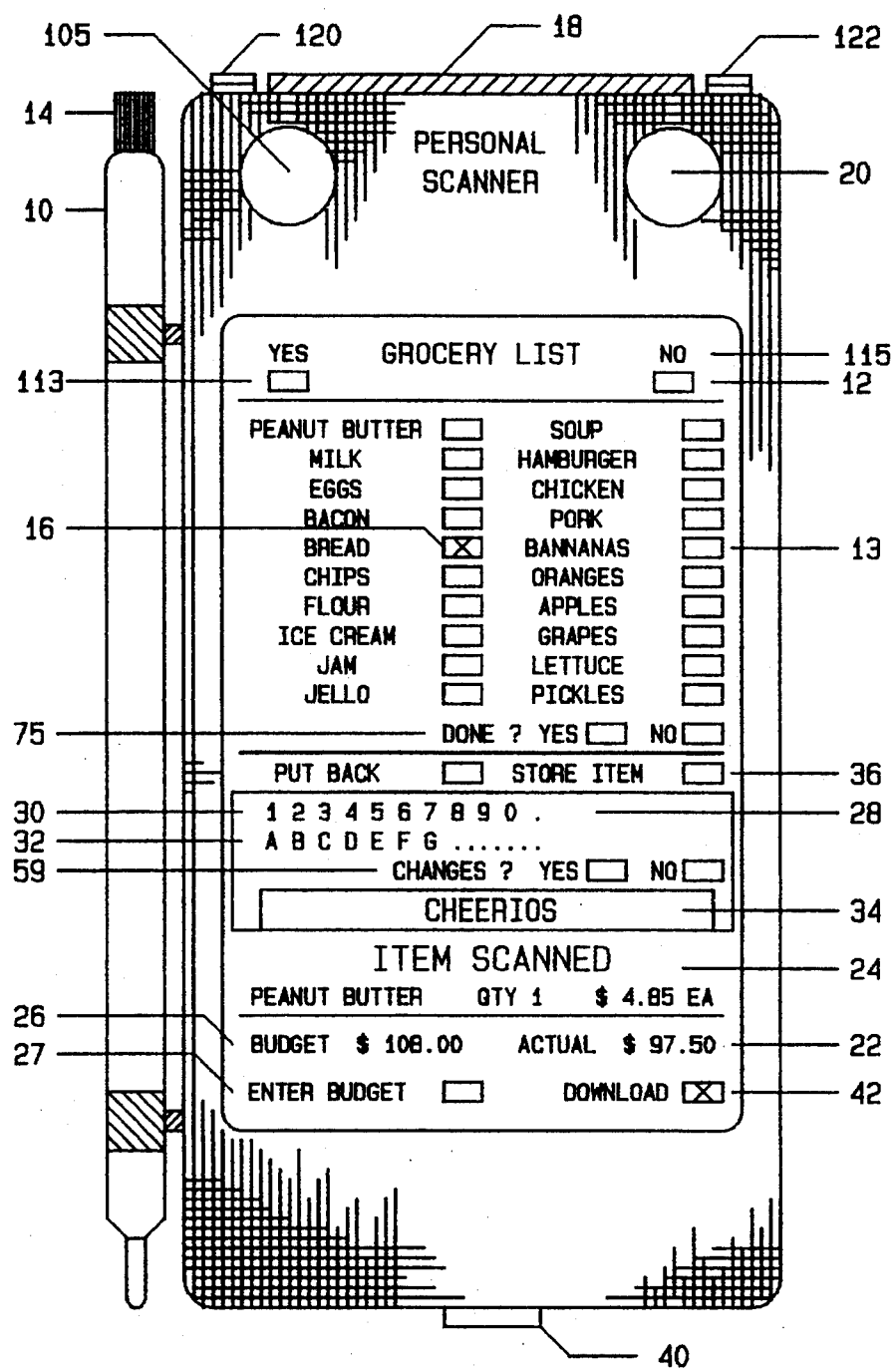
FIG. 1 is a top view of one embodiment of a Personal Scanner TM device.
Figure 2:
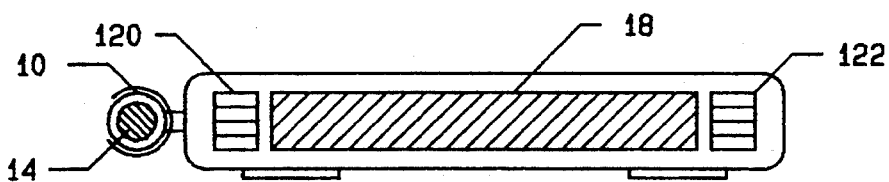
FIG. 2 is an end view of the device of FIG. 1 showing the preferred placement of permanent magnet security strip disarming devices and the scanning window.
Figure 3:
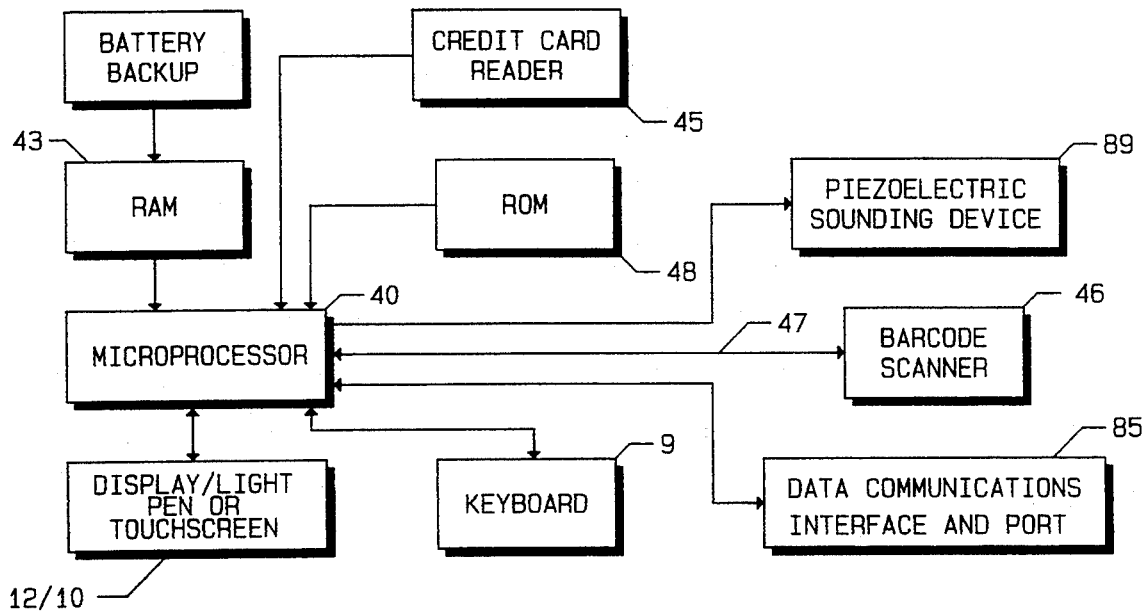
FIG. 3 is a block diagram of a typical Personal Scanner TM type device.

Referring to FIG. 1, there is shown a plan view of a device according to one embodiment of the invention where a light pen is used to provide user input. In other embodiments, a touchscreen, mouse, stylus or other choosing device may be used to provide user input. FIG. 2 shows an end view of the device looking into a window through which bar codes are scanned. FIG. 3 shows a block diagram of the electronic structure of the preferred embodiment of the Personal Scanner TM device. Hereafter, the genus of devices according to the teachings of the invention may be referred to as the Personal Scanner TM because the technology is also useful for other applications such as shopping in department stores, taking inventory, etc. The purpose of the Personal Scanner TM device in the most basic embodiments is to aid shoppers in generating shopping lists and shopping to fill those lists while keeping track of their total expenditures. This is done by having the user scan the bar code labels on items taken from the shelves and placed in the shopping cart. The Personal Scanner TM device comprises, in the simplest embodiments, of a bar code reader coupled to a specially programmed digital computer which can use the output of the bar Code reader to identify the items placed in the basket and compare them to the currently selected shopping list. The user can generate one or more shopping lists by providing user input via some feedback method to select or identify the items to be put on the list. In the embodiment shown in FIG. 1, this is done by the user via a light pen 10. The shopping list is then stored in RAM 43. Alternatively, preprogrammed shopping lists may be stored in nonvolatile memory such as ROM 48. Likewise, in embodiments using a palmtop computer, the RAM 43 and/or ROM 48 may be supplemented or replaced by memory cartridges coupled to the palmtop device via the PCMCIA standard integrated circuit memory expansion card interface. These external memory cartridges may be used to store shopping lists such that a collection of different shopping lists larger than the capacity of the internal memory can hold may be stored in a nonvolatile manner.

A light pen is not critical to the invention and any other way for users to provide input to the Personal Scanner TM device such as touch screens, keyboard, slewing alphabets such as are used on the ARNAV R50 Ioran etc. or telephone type keyboards such are in common use on telephones and some GPS units such as the Garmin 100 AVD GPS portable navigator may also be used. The purpose of user feedback to the Personal Scanner TM device is to allow users to generate shopping lists by selecting items from pre-stored lists which list all possible items that a shopper may want. By selecting some smaller subset of items that the user customarily consumes, smaller personalized shopping lists may be generated. Multiple shopping lists may be generated and stored and displayed on the screen 12 when needed. Typically, the screen is a liquid crystal or supertwist display but any other display technology compatible with the available battery power will suffice. To generate one of these lists from a universal list, the universal list is called to the screen by pressing button 14 on the light pen or another button (not shown) on the front panel for touch screen or other embodiments with no light pen. The user then selects items from the universal list for inclusion in the "short list" being composed. In light pen embodiments, the items are selected from the universal list are selected by touching the box 16 associated with a particular item or the item itself. In touchscreen embodiments, the user's selections are sensed by sensing which item on the display is touched by the user. The item then will appear on the short list with a box beside it that is coded on the display in a particular manner such as being filled in as shown in FIG. 1. In the preferred embodiment, a touchscreen is used so that the user need only touch the name of the item itself or an associated item "button" next to the name of the item with his or her finger or an ink pen, pencil etc. to indicate a selection to the Personal Scanner TM device.

In even simpler embodiments, only one shopping list is used which could be selected by the user as indicative of the types of foods or other items that user consumes normally. In these embodiments, the Personal Scanner TM device would be offered in different models, each with a different shopping list. The user would select the model to use or purchase based upon the type of shopping list stored therein.

When the user is ready to shop, the user takes the personal shopper to the grocery store and selects items from the shelves and puts them in his or her shopping cart. As the items are being put into the shopping basket, the bar code label on the package is scanned with a bar code scanner the window for which is shown at 18 in FIGS. 1 and 2. In the preferred embodiment, the bar code scanner within the Personal Scanner TM device is a charge coupled device type because of its lower cost and lower power consumption and because it can tolerate curved surfaces such as are found on cans. In alternative embodiments, the bar code scanner can be a laser diode based scanner, LED contact scanner, optical or magnetic scanner or character reader.

To scan an item using the CCD type bar code scanner, the user places the window 18 in contact with the bar code label on the package, and presses button 20 to start the scan. The bar code is then scanned and the resulting signals are decoded into the ASCII characters etc. which were originally encoded into the bar code (any other code such as EBCDIC could also be used). The ASCII characters identify the item, and are compared to the shopping list for a match. If a match is found, then the box beside the matching item on the shopping list has its display changed to another coding indicating the item has been scanned and is in the basket. Typically, this will be an X inside the box, but any other coding can be used.

In some embodiments, a running total of the cost of all the items in the basket is kept and shown on the screen. In the embodiment of FIG. 1, the running total is shown at 22, and the price of the individual item just scanned is shown at 24. The running total is generated by comparing the identity of the item derived from the bar code identity to a price list. The price list is stored in the handheld scanner. In some embodiments, the price list is downloaded by the handheld scanner upon entry to the store. This can be done by direct connection to the store's computer via an RS232 port shown symbolically at 40 in FIG. 1. In other embodiments, a wireless downloading process can be performed upon entry to the store. In this embodiment, an infrared transceiver such as the Photonics Infrared Transceiver TM is included with the handheld scanner. Likewise, the store's computer coupled to its laser scanners also includes an infrared transceiver. When the user enters the store, he or she downloads the price list by touching the download button 42 on the screen with the light pen or a physical button (not shown) located elsewhere. The Personal Scanner TM device then downloads the store's current price list using the infrared transceiver or the RS232 port. In some embodiments, the price list can be entered by hand when an item is scanned.

In the preferred embodiment, the price list is data compressed using known compression algorithms used in FAX machines prior to transmission to the Personal Scanner TM device and is stored in compressed form. The list can be decompressed in the Personal Scanner TM device prior to use in updating the running total as each item is scanned or during the processing of FIG. 12.

In some embodiments, the price list information downloaded from the store can be used to make the user a more informed shopper. For example, the items that are on sale or which have risen in price since the last download operation from the same or a different store can be displayed in separate displays or their status can be indicated on the shopping list. For example, the items on the shopping list that are on sale or which have a lower price than the same item price at a different store from which the price list was last downloaded can be flashed, while the items that have risen in price can be highlighted with reverse video.

In some embodiments, the user can designate a budget available to spend. Such a budget figure is shown at 26. In the embodiment shown in FIG. 1, the budget figure can be set by the user using the light pen and selecting the numbers in the budget figure serially using the displayed numbers 0–9 and the decimal point shown at 28 in window 30.

Likewise, the letters of the alphabet are shown at 32 in window 30. These letters can be selected individually to make up an item to add to the shopping list.

Alternatively, the shopping list can be generated from a null list or an existing list can be expanded by scanning items that the user wishes included on the list one by one. As each item is scanned and its bar code is decoded, the identity of the item appears in subwindow 34. The user can then add the item displayed in the subwindow 34 by touching the "store item" box 36.

Figure 4:
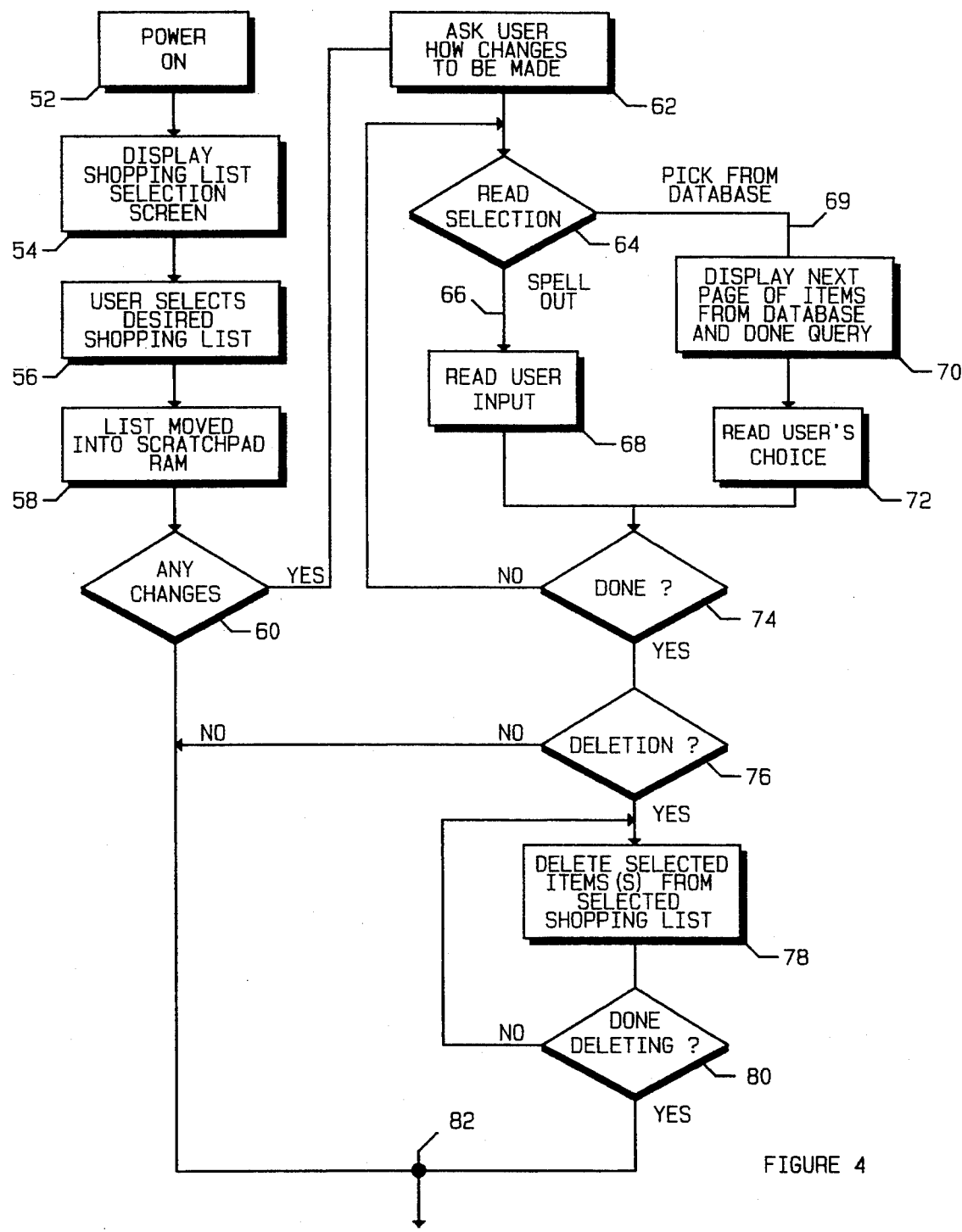
FIG. 4 is a flow chart of the processing which selects from prestored shopping lists, allows modification of those lists or generation of custom lists from a nil list.

Referring to FIG. 4 there is shown a flow chart for processing by the simple embodiment of the Personal Scanner TM device shown in FIG. 3. When power is first applied to the unit as symbolized by block 52, the microprocessor 40 scans the ROM 48 to determine the number and names of all the available "fixed" shopping lists, if any, and scans battery backed up RAM 43 to determine the names of any custom shopping lists stored therein. The names of all the available shopping lists are then displayed on a sign-on screen. This process is symbolized by block 54.

The user then selects the shopping list desired by touching a box displayed next to the list on the list itself with the light pen or through any other method of selection. This process is symbolized by block 56.

The selected shopping list is then displayed and moved into an area of RAM 43 reserved as a scratchpad RAM, as symbolized by block 58.

The user is then asked whether there are any changes to the list by blinking or reverse video or color change of the word "changes" displayed at 59 in FIG. 1. The user then touches the "yes" or "no" box displayed next to the word "changes". This process along with the process of sensing the answer to the question is symbolized by block 60.

If there are to be changes, the microprocessor asks the user whether the changes are to be spelled out by the user by selection of letters and/or numbers from the display window 30 or whether the user wishes to pick from the database of all possible choices. This process is symbolized by block 62 and block 64. If the user chooses to spell out the desired changes, path 66 is taken to block 68 which represents the process of reading the user's input selections. In the embodiment of FIG. 3, this input will be by light pen selection of letters and/or numbers displayed in window 30 in FIG. 1. In other embodiments, a touch-screen will be substituted for display/light pen combination 12/10 in FIG. 3, and the process of sensing user input will be the process of sensing touches to the screen in display window 30 or in window 13 is the user chooses to enter changes by displaying the universe of possible choices in window 13. In other embodiments such as an embodiment using a EPSON palmtop computer with a built in touchscreen and keyboard, the user's input may be entered by an optional keyboard 9 or through touches to the touchscreen.

If the user chooses to make the changes by picking items from the database, path 69 is taken to the process represented by block 70. The processing of block 70 comprises displaying the next page of items from the database along with a done query which inquires whether the user has found the item he or she wishes to add to the list. Block 72 represents the process of reading the user's selections from the light pen, touch screen etc. and adding the selected item to the shopping list. Block 74 represents the process of determining whether the user is done selecting from the items displayed in the window 13 or is done selecting letters and numbers from the window 30. This done query is shown at 75 in FIG. 1. If the user is not done, processing returns to block 64 where the user is given the choice of making further additions either by choosing items displayed from the database or by spelling out the additions as described above.

If the user is done making additions, block 76 is performed to determine if there are any deletions. If deletions are to be made, the processing represented by block 78 is performed to sense the selected items designated by the user through the light pen or touch screen and to delete them from the selected shopping list. Block 80 processing is performed to determine if the user indicates he or she is done deleting. If not, processing returns to block 78. If so, processing proceeds on path 82 to the process represented by the flow chart of FIG. 5 to scan items from the shopping list into the Personal Scanner TM device. Processing also proceeds along path 82 if the user indicates during the processing of block 76 that he or she has no deletions or if the user indicated in the processing represented by block 60 that no changes to the selected shopping list were necessary.

Figure 5:
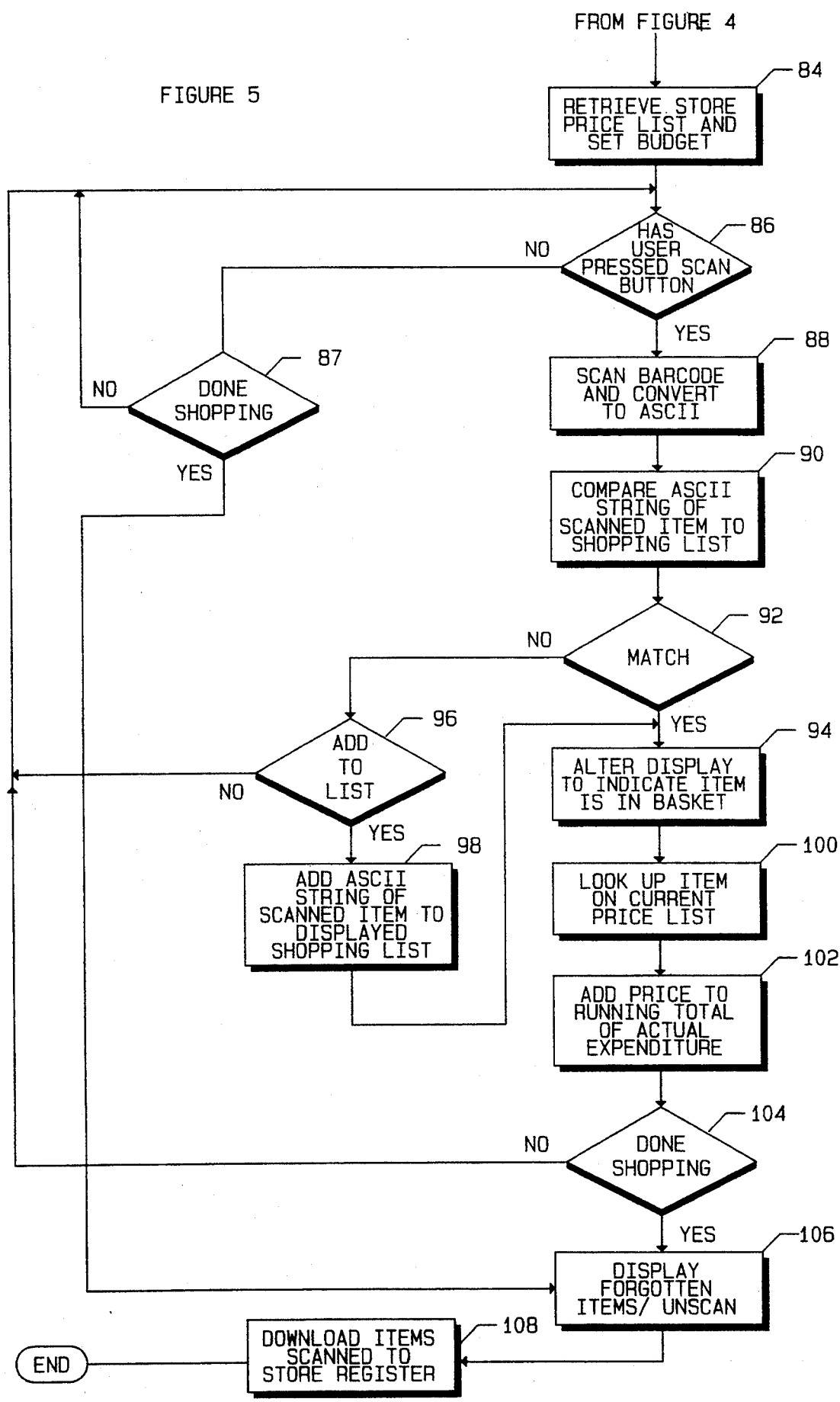
FIG. 5 is a flow chart of processing to retrieve the current price list, scan an item, look for matches on the shopping and price lists, display forgotten items and download data from scanned items to the store computer.

Referring to FIG. 5, there is shown a flow chart for processing for retrieving the store price list, comparing the price list to another price list and for scanning in the items put in the user's basket and displaying the running total of items scanned. Block 84 represents the process of retrieving the store's Current price list and giving the user the opportunity to set the budget number which appears at 26 on the display. Setting the budget number only occurs if the user touches the set budget box 27 on the display. If he or she wishes to set a budget, the numbers comprising the budget number are individually selected from the numbers and decimal point displayed at 28 in window 30. The Personal Scanner TM device assumes that the user is done entering budget numbers when a decimal point and two numbers to the right of the decimal point have been selected. In embodiments having a keyboard such as embodiments using the EPSON palmtop computer, the user may enter only a dollar figure and press enter at which time the machine will assume that an even dollar amount is selected for the budget number. Retrieving the store's current price list can be done in any one of several way using a data communication interface and port 85 in FIG. 3. In some embodiments, the data communications interface and port is a modem and a serial or parallel bidirectional data port with appropriate driver circuitry and software. In other embodiments, the data communications interface and port is an infrared transceiver such as the one commercially available from Photonics of San Jose, Calif. Some information on infrared and radio wireless data transmission is publicly available through the IEEE 802.11 Wireless Networking Work Group. The transmitted and received infrared patterns comprise a series of data symbols transmitted serially using pulse position encoding. Preceding the data is a timing pattern that allows the receiving unit to synchronize its internal clock with the clock of the transmitting unit. The infrared transmission is diffuse rather than directed and data rates of 1 Megabit/second can be obtained. Any infrared or radio wireless data transfer device that is capable of downloading the store price list in a reasonable amount of time will suffice for purposes of practicing these type embodiments. The details of the particular data communication interface and port are not critical to the invention, and selection of what type port to use depends upon the desired mode of operation for the device. In some embodiments, the processing of block 84 represents the process of a user dialing the computer of the store of interest using either an internal or external modem (not shown) coupled to the microprocessor 40 through data communications interface and port 85 and downloading the store's current price list by dialing the store computer. In embodiments, using the EPSON palmtop computer an internal modem is preferred, but in embodiments using the embodiment shown in FIG. 1, an external modem is preferred. In embodiments using a palmtop computing device, the modem may be attached through a PCMCIA Type II interface. In embodiments where the data communications interface and port 85 is a Photonics Infrared Transceiver TM (available commercially from Photonics Corporation, 2940 North First Street, San Jose, Calif. 95131), the processing represented by block 84 is the process of logging onto the store's local area network in infrared wireless fashion when the user enters the store and downloading the store's price list.

Query 86 represents the process of scanning the keyboard and waiting for the scan button 20 in FIG. 1 to be pushed. When it is pushed, the Personal Scanner TM assumes that the bar code of the item to be placed in the basket has been placed within range of the scanning window 18, and scanning proceeds in a known fashion. In alternative embodiments, the button 20 can be eliminated and a scanner with proximity sensing capability may be substituted. Such scanners are commercially available and sense when they have been placed adjacent to a bar code. Such scanners automatically scan and decode any bar code placed within view. The process of scanning the bar code and converting the resulting pattern of signals from the bar code scanning apparatus to ASCII (or EBCDIC etc.) characters is well known in the art. Basically, the bar code scanner 46 converts the bars and spaces of the bar code pattern to a signal waveform that makes transitions between two digital levels in a predetermined unique pattern for each unique bar code. This unique bar code pattern waveform is transmitted to microprocessor 40 via bus 47 where the waveform is applied to a decoder which converts the pattern to a series of ASCII characters, and usually calculates a checksum to check the validity of the decoded characters and releases the decoded characters after verifying a correct checksum. Equipment to do this is commercially available from several sources including Densei Nippon Electric Industries of Tokyo, Japan. Generally, bar code scanners come in three classes: lasers which are expensive and consume large amounts of power, LED devices which must be physically moved past a bar code and which consume large amounts of power and CCD imaging devices which image the entire bar code and then electronically scan it and convert it to the unique waveform representing the bar code. It is the CCD class of bar code scanners which work best for the Personal Scanner TM device application because they need not be in contact with the bar code and they consume less power than many other types of bar code scanners. Densei makes CCD type bar code scanners such as the Model BCH5532 Bar Code Reader. The details of the Densei line of CCD bar code scanners in general, and the Model BCH5532 scanner in particular are hereby incorporated by reference. Other types of bar code scanners will also work such as the bar code scanner disclosed in U.S. Pat. No. 4,204,636 to Hayman, which is hereby incorporated by reference. After a bar code has been successfully scanned and decoded, the microprocessor 40 sends a suitable waveform to the piezoelectric sounding device 89 in FIG. 3 to give the user an audible tone that the bar code has been successfully scanned.

If the user does not press the scan button for a predetermined time of, for example 30 seconds, the microprocessor displays a query as to whether the user is done shopping as symbolized by block 87. If the user is done, he or she presses the button 105 on the front panel when he or she has reached the checkout clerk and connected the Personal Scanner TM device to the store's register. This causes the processes symbolized by blocks 106 and 108 to be performed to transfer the scanned items to the store registers as will be described further below.

Block 88 represents the process of scanning the bar code on the package to be placed in the cart and converting the light and dark bars of the bar code from an analog waveform to a collection of digital representations of ASCII characters. When a bar code has been successfully scanned, a beep tone is emitted from a piezoelectric sounding device 89 in FIG. 3. Block 90 represents the process of comparing the ASCII characters of the bar code to the active shopping list currently stored in memory 43. Block 92 represents the process of determining if there is a match between the ASCII string and any entry on the shopping list. If there is, then the display is altered to indicate the item has been placed in the basket, as symbolized by block 94. If there was no match, the user is asked whether he or she wishes to add this item to the shopping list as symbolized by block 96. This is done by displaying some indication that the item scanned is not on the shopping list. Typically this is done by displaying the word ADD on the display in some designated area or lighting an ADD LED (not shown in FIG. 1) on the front panel and displaying "yes" and "no" option boxes on the display. If the user indicates the item is to be added to the shopping list, the ASCII string from the decoder is added to the shopping list as symbolized by block 98. If the user elects not to add the item to the list, processing returns to block 86 to scan the front panel controls for another push of the scan button. After block 98 processing is completed, the processing of block 94 is performed to alter the display to indicate the item has been placed in the basket.

Next, the price of the item just scanned is looked up on the current price list corresponding to the store from which the item is being purchased as symbolized by block 100. The price of the item is then added to the running total for all the groceries placed in the basket, and the running total is displayed at 22 on the display as symbolized by block 102. In some embodiments, if the user wishes to buy more than one of the scanned item, each item must be individually scanned, and this embodiment is assumed for the flow chart of FIG. 5. In other embodiments, another step is present where the computer asks the user how many of the item scanned have been placed in the basket by writing a query to the display to which the user responds by touching a number in the window 30 in FIG. 1 or touching a number key on the keyboard. The microprocessor then multiplies the price of the item by the number of items placed in the basket and adds the result to the running total.

For unpackaged items such as fruit and vegetables, the grocery store must have a produce clerk with a scale and bar code machine who is available for bagging and labelling produce with bar codes which can be scanned. This clerk is available to shoppers who bring produce to the clerk. The clerk weighs and bags items that are sold by the pound and creates a bar code which encodes the item description and its total price. Preferably, the clerk will have available a scale which weighs the item and automatically multiplies the weight by the current price and outputs a properly encoded bar code. Such scales are available commercially from Global Equipment of Oakland, Calif. (Ph(510) 271-0030, distributors for the Kobota FP900 series scale. Alternatively, the shopper can weigh the item on a scale, input the weight and input the unit price. The Personal Scanner TM device will then multiply the weight by the unit price and add the result to the running total.

Block 104 represents the process of querying the front panel display or controls for a signal from the user that he or she is done shopping. In the embodiment depicted in FIG. 1, this signal is generated with the user presses button 105 on the front panel. When this occurs, the processing of block 106 occurs to display forgotten items and unscan any item the user wishes to place back on the shelf. Typically, the forgotten items are displayed by blinking or converting to reverse video the forgotten items from the shopping list, i.e., those items on the list which were not matched with any scanned item. The user may also unscan any item in the cart at this stage by touching the item to be unscanned on the display twice in short succession. This indicates to the Personal Scanner TM device that the touch to the display is not a random touch. If two touches are detected within a short time, the item touched is removed from the list of items scanned, and a downward adjustment in made in the running total. Next, the processing symbolized by block 108 is performed to download the descriptions and prices of the items scanned to the store's register so that the order can be paid for by the shopper. In the preferred embodiment, the downloading process is carried out by coupling the Personal Scanner TM device to the store register through RS232 port 40 in FIG. 1 by a cable. In alternative embodiments, the scanned items may be transferred to the store register through a Photonics Infrared Local Area Network Wireless Interface coupled to Data Communications Interface and Port 85 in FIG. 3. The checkout clerk then physically checks each item in the basket against the list downloaded from the Personal Scanner TM device and makes any necessary corrections. The bill is then totalled and the customer pays the clerk.

Figure 6:
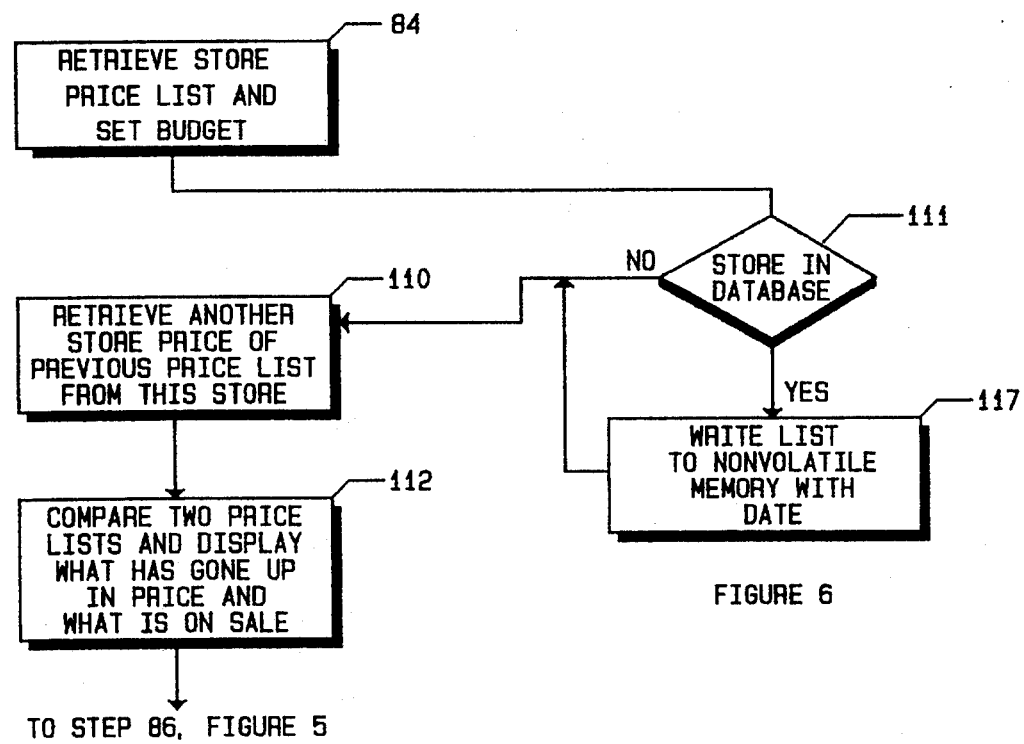
FIG. 6 is a flow chart of processing to retrieve another price list from an earlier time or another store and compare prices item by item and display items that are higher and lower in price.

FIG. 6 shows a flow chart for an alternative embodiment of—Personal Scanner TM device which can compare one store price list against the price list from another store or an earlier price list from the same store. Block 84 represents the same process as it did in the flow chart of FIG. 5. A variation from the flow chart of FIG. 5 for this embodiment involves the option to store the current price list in a database stored in nonvolatile memory. Typically, space in battery backed up random access memory 43 in FIG. 3 will be reserved to store one or more old price lists from the shopper's favorite store or from another store. Block 111 represents the process of inquiring of the user whether to store the current price list in the database. If the user wishes to store the list, he or she touches the "yes" button on the front panel display at 113 in FIG. 1. This causes the data defining the current price list to be stored in RAM 43 (or on a hard disk in embodiments using palmtop computers) with the current date as represented by block 117. If the shopper does not want the current price list stored in the database, the "no" box at 115 in the display of the embodiment shown in FIG. 1 is touched physically or with the light pen.

Block 110 represents the process which is performed after the processing of block 111 is performed if the user chooses not to store the price list, or after the processing of block 117 is performed if the user chooses to store the price list. The process of block 110 consists of retrieving a price list from another store or from a database of previous price lists from the store currently being shopped. In the case of retrieving a price list from another store, this may be done by modem as described above by dialing the computer of the store in question or by physically entering the store and downloading their price list through the RS232 port 40 in FIG. 1 or through the Photonics Infrared Transceiver LAN Interface. In the case of retrieving an old price list from the store currently being shopped, the microprocessor will query the user as to which price list to retrieve in the case there are more than one old price list stored in the database. If there is, the user may respond by selecting a date using the numbers displayed at 28 in FIG. 1.

Block 112 represents the process of comparing the current price list item by item with the price list from another store or a previous price list from the same store associated with the current price list. The comparison process indicates which items have risen or fallen in price. Items which have risen in price are displayed in some appropriate fashion such as reverse video while items which have fallen in price are displayed in another way such as by blinking the entry etc.

One of the possible benefits of use of the Personal Scanner TM device is that it may make it possible for grocery stores to reduce their headcount in using fewer checkout clerks since the checkout line will move much faster. Obviously because the Personal Scanner TM device can electronically transfer the information therein to the store register much faster than a checkout clerk can scan each item in a shopper's basket, the checkout lines should move much faster. One concern grocery stores will have of course is in the area of security. To prevent shoppers from putting things in their carts which have not been scanned and then leaving the store with them, in one alternative embodiment, a security strip deactivation system is employed. In the preferred embodiment, the security strip is a magnetic strip upon which other information such as the unit price etc. may be printed. These magnetic strips, when not deactivated and passed through an alternating current magnetic field, cause intermodulation products which can be detected and which set off alarms. These magnetic strips can be deactivated so that the intermodulation products are not created by exposing them to a D.C. or permanent magnet field. Accordingly, in embodiments in which the security strip deactivation system is used, two or more permanent magnets 120 and 122 are mounted on the end of the Personal Scanner TM device adjacent to the scanning window 18 as shown in FIGS. 1 and 2. These magnets are permanent magnets and each has a north and south pole. The magnets 120 and 122 are mounted such that their north and south poles face in opposite directions so as to strengthen the magnetic field that they create in front of the scanning window 18. In other words, if permanent magnet 120 has its north pole facing inward toward the casing of the Personal Scanner TM device, then permanent magnet 122 will be mounted to have its south pole facing inward toward the casing. Such a system is disclosed in U.S. Pat. No. 5,187,354, which is hereby incorporated by reference. For embodiments using memory which is sensitive to magnetic fields such that data might be lost such as hard disks or floppy disks used in palmtop computers adapted to the Personal Scanner TM device functions, it is preferred to provide some magnetic shielding between the magnets 120 and 122 and any memory which is magnetically sensitive. Such shielding can be some metal which prevents magnetic field lines from penetrating therethrough.

For items which are to be unscanned and put back on the shelf with this embodiment, it will be necessary for the store to re-magnetize the security strip before putting the item back on the shelf.

Of course the above described security system is subject to abuse by unscrupulous shoppers who may deactivate the security strips by putting the Personal Scanner TM device scanning window close to the security strip to deactivate it but not pressing the scan button to actually scan the bar code. To prevent this, the permanent magnets 120 and 122 in FIGS. 1 and 2 can be replaced with D.C. magnet coils which create D.C.

magnetic fields only when the scan button is pushed. In this embodiment, pushing the scan button simultaneously cause bar code scanning to occur and routing of direct current through the coils of electromagnets mounted in the positions of magnets 120 and 122 to create the required D.C. magnetic field.

Figure 7:
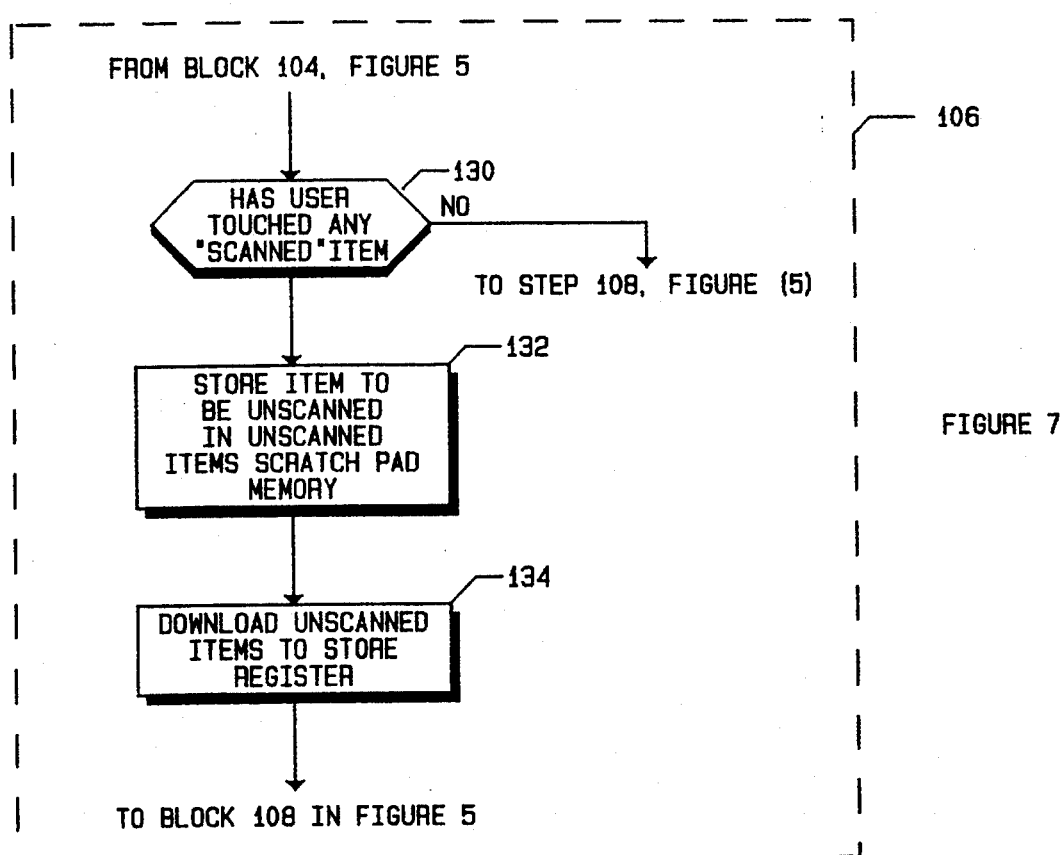
FIG. 7 is a flow chart for processing in deleting an item from the list of items that have been scanned.

Referring to FIG. 7, there is shown an alternative embodiment for a security system for items to be unscanned. In this embodiment, the Personal Scanner TM device software automatically assumes that any item on the shopping list displayed as "scanned" is to be unscanned if the user touches it twice in rapid succession on the touchscreen or with the light pen. The process of monitoring for such an event is symbolized by block 130. If this event does not occur, control is passed to block 108 in FIG. 5. If it does occur, then the processing of block 132 is performed to store any item(s) to be unscanned in a special scratchpad memory or database of such items. Thereafter, the unscanned items are downloaded to the store register in a separate transaction from the items that are scanned and the shopper intends to purchase as symbolized by block 134. The checkout clerk then requests that the shopper hand the items which were unscanned to him or her for placement back on the shelves.

Figure 8:
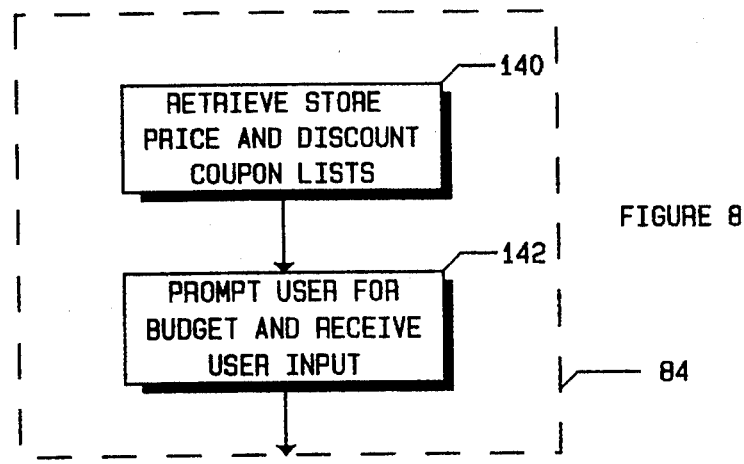
FIG. 8 is a flow chart for processing to allow a user to enter a budget number.

Referring to FIG. 8, there is shown an alternative embodiment for the processing of block 84 in FIG. 5 to automatically download coupon lists. In this embodiment, the processing of block 84 in FIG. 5 is replaced by the processing shown in FIG. 8. When the user enters the store and attaches the Personal Scanner TM device to the store local area network via port 85 in FIG. 3 either by cable or through the Photonics Infrared Transciever LAN interface or when the user dials the stores computer by modem and downloads the store's current price list, he or she also receives the current list of "coupons", i.e., the list of items currently discounted. This list is stored for later comparison to each item scanned. This process of downloading the price list and coupon list is symbolized by block 140 in FIG. 8. Block 142 symbolizes the process of prompting the user for the budget number and receiving the user's input.

Figure 9:
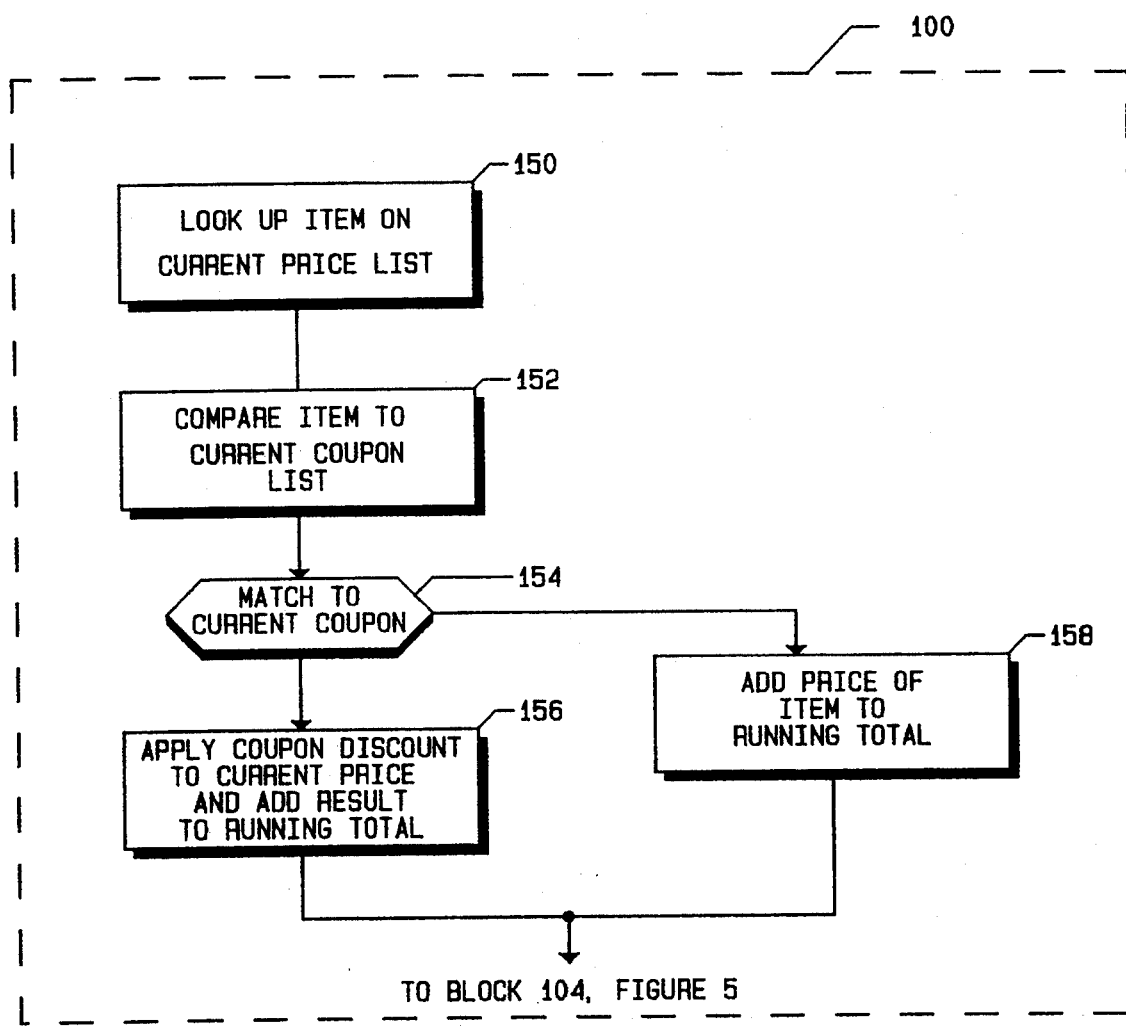
FIG. 9 is a flow chart of processing to automatically apply coupon discount items for any scanned item found on the current coupon list.

FIG. 9 represents the processing which occurs in place of blocks 100 and 102 in FIG. 5 in embodiments where automatic coupon accounting is employed. Block 150 represents the process of looking up the item scanned on the current price list. Next, the item scanned is compared to the current coupon list downloaded in block 140 as symbolized by block 152. Any match is detected in block 154. If there is a match, the coupon discount percentage or absolute amount is applied to the current price, and the result is added to the running total as symbolized by block 156. If there is no match to the coupon list, the current price of the item scanned is added to the running total as symbolized by block 158. After the processing of either block 158 or 156, processing control is passed to block 104 in FIG. 5.

Figure 10:
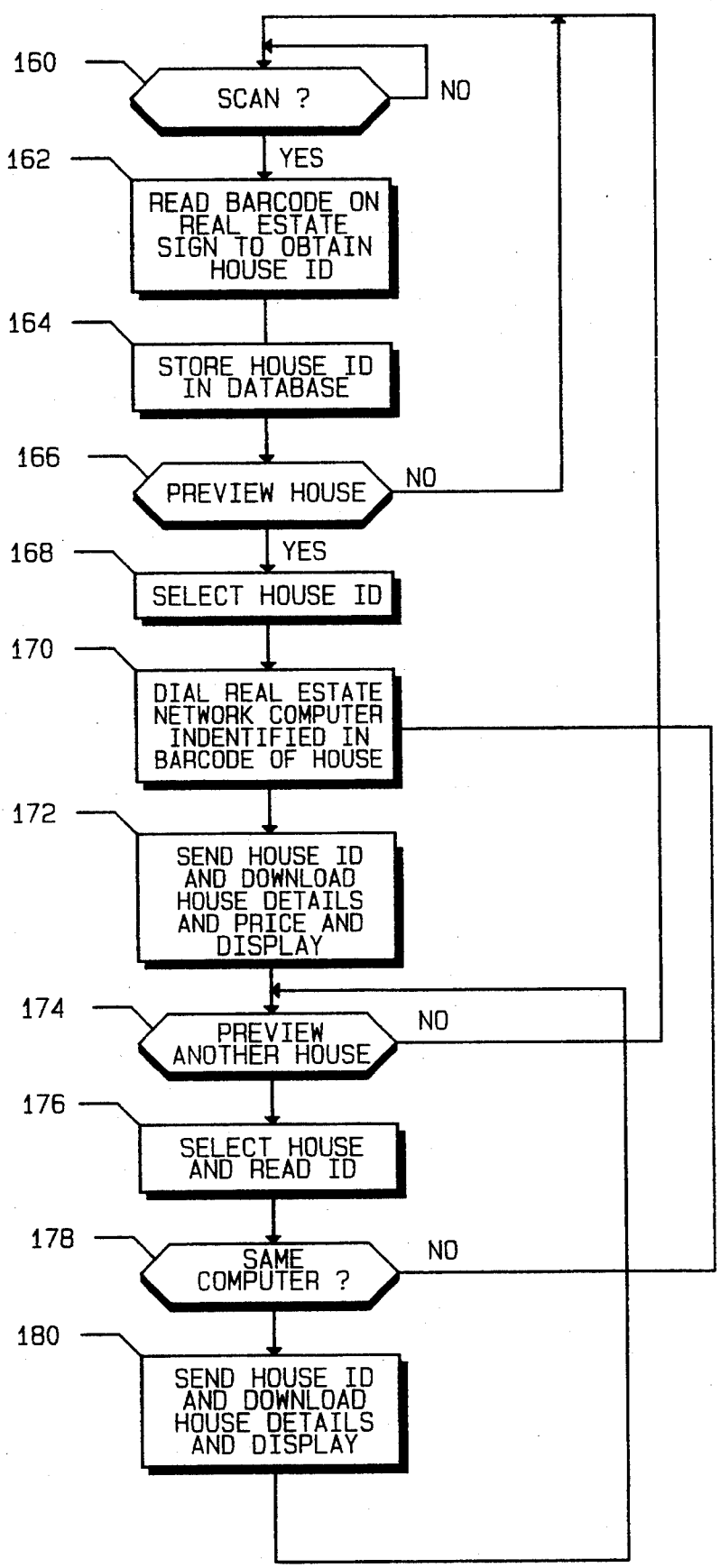
FIG. 10 is a flow chart representing processing to scan house bar codes and download house listing details after all candidate houses have been scanned.

Referring to FIG. 10, there is shown a flow chart for processing for an embodiment of a Personal Scanner TM device useful for shopping for real estate. In this embodiment, real estate signs would include bar codes that provide a house or property identification code and the area code and telephone of a computer in a real estate network which stores details about the listing. The user would be able to scan and store the bar coded information of properties in which he or she was interested in the neighborhoods of interest, and download the details about the property and review it before ever calling a real estate agent.

The process of FIG. 10 starts with the user placing the Personal Scanner TM device within range of the bar code on a real estate sign and pressing the scan button (no processing to pick, display and modify a shopping list is present in this embodiment), as symbolized by block 160. The unit sits and idles until this happens. When the scan button is pushed, the bar code on the sign is read, decoded and the ASCII house ID and the telephone number of the pertinent computer are stored in a database in scratchpad, battery backed up RAM. This process is symbolized by blocks 162 and 164. The user is then queried in block 166 as to whether a house is to be previewed. If the user answers no, control is returned to the loop which waits for the scan button to be pushed. If the user answers yes, the list of all house ID's is displayed by the process symbolized by block 168, and the user can highlight one of them to preview by touching the particular ID on the touchscreen or with the lightpen. Preferably the house IDs are the street addresses of the house to help the user remember which house is which if multiple houses have been scanned.

The processing symbolized by block 170 represents the process of using an internal modem or an external modem coupled to the port 85 in FIG. 3 to dial the computer phone number associated with the house ID which has been highlighted and log on. The house ID is then passed to the computer in block 172, and the details of the house listing are downloaded such as square footage, number of bedrooms, fireplaces, amenities and price. These details are displayed, and in a separate area of the display, a query is displayed regarding whether the user wishes to preview another house, as symbolized by block 174. If the user answers no, control is passed back to block 160. If the user answers yes, the processing of block 176 is performed to redisplay the list of houses so as to allow the user to select another house. After the user selects another house, the ID is read and the Personal Scanner TM determines if the record for that house is stored on the same computer as the last house previewed as symbolized by block 178, if it is, the house ID is sent to the same computer to which the user has already logged on and the house record is downloaded and displayed as symbolized by block 180. If the house record is stored on a different computer, the Personal Scanner TM device hangs up and dials the computer associated with the highlighted house record as symbolized by the processing of block 170. Thereafter, processing is as previously described.

Figure 11:
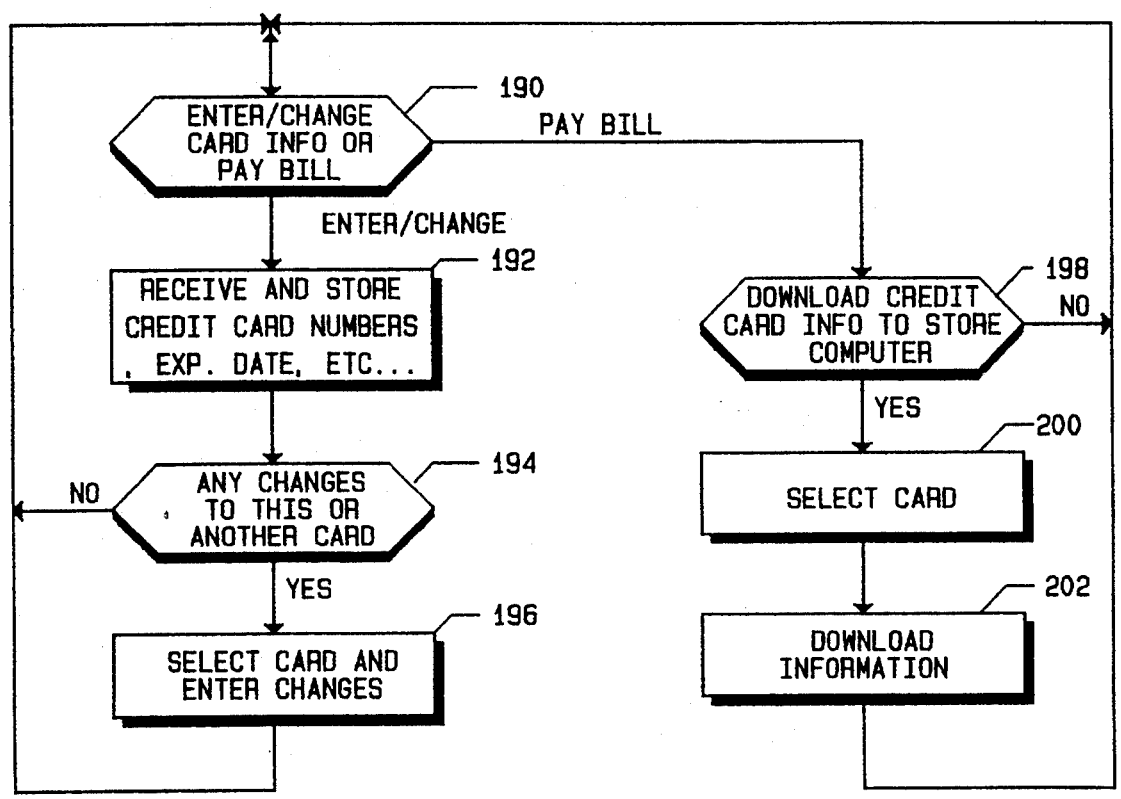
FIG. 11 is a flow chart representing processing to enter/change credit card information and download credit card information to a store computer for use in completing a purchase.

Referring to FIG. 11, there is shown a flow chart for processing to enter and change credit information and download credit card information to the store computer at the time a shopping order is to be paid. Block 190 represents the process of prompting the user to determine if the user wishes to enter credit card information for a new credit card or change information on an old .credit card or specify a credit card with which to pay the bill. If the user answers that he or she wishes to enter a new credit card or change the data of a stored credit card, the processing of block 192 is performed. This block represents the process of receiving user input naming the credit card, giving the name shown on the face of the card, the card number and the expiration date. In some embodiments, the credit card information can be entered by "swiping" the credit card through a commercially available credit card reader 45 in FIG. 3 which reads the magnetic strip on the card and sends the data to the microprocessor 40. After the credit card data is entered, the user is prompted for any changes to the card data just entered or any other card previously stored as symbolized by block 194. If the answer is no, processing returns to block 190. However, if the answer is yes, the processing of block 196 is performed to allow the user to select the card to be changed and receive the changes to the card data. Thereafter, processing returns to block 190.

If the user answers the query of block 190 that he or she wishes to pay the bill for the shopping which has been completed with a credit card, processing is vectored to block 198. There the user is queried whether he or she wishes to download credit card data to the store computer as represented by block 198. If the answer is no, processing returns to block 190. If the answer is yes, processing is vectored to block 200 which represents the process of displaying the list of stored credit cards to the user and receiving the user's selection as to which card is to be used. Thereafter, the card data is downloaded to the store computer, as symbolized by block 202.

Figure 12:
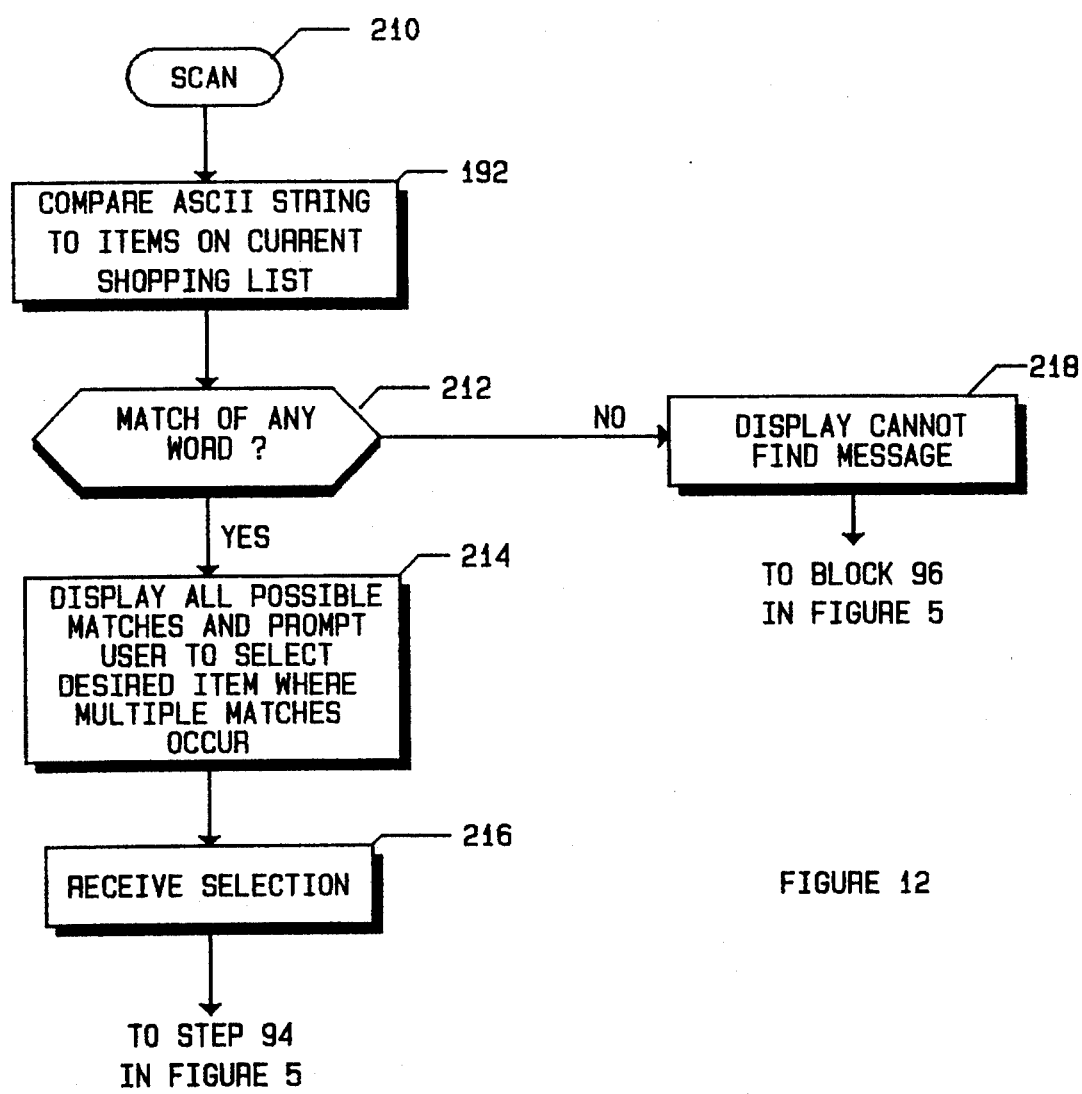
FIG. 12 is a flow chart of processing of fuzzy logic used for matching precise store descriptions mapped to scanned bar codes encoding product identifications with somewhat less precise descriptions of desired items on a user defined shopping list.

FIG. 12 represents the flow chart for match processing for comparing the ASCII string of a scanned item to the active shopping list and active price list. The problem solved by the processing of FIG. 12 is that shoppers may not use the same prose to describe the desired item to be added to a shopping list as exists in the store computer to describe the same item. For example, the user may enter only "peanut butter" on his or her shopping list whereas the store computer may have entered therein three entries for "Skippy brand, chunky style peanut butter", "Skippy brand, creamy style peanut butter" and "Jiffy brand, chunk style peanut butter". Since there is not a complete overlap between what is scanned and what is on the shopping list, the Personal Scanner TM device software must use "fuzzy logic" to determine which item on the shopping list corresponds to the item scanned. In FIG. 12, this fuzzy logic is implemented by blocks 192, 210, 212 and 214. The processing of FIG. 12 is an alternative process to that symbolized by block 92 in FIG. 5. The bar codes on products do not encode the entire description of the product. They only encode a product identifier which is mapped in the store computer to an ASCII string which describes the product in the manner seen by the user on his or her receipt. When the user downloads the price list, the ASCII string for each item available in the store is downloaded with its price and its bar code ID. Block 192 represents the process of mapping the bar code ID received from the scanner to the ASCII string describing the product downloaded from the store computer with the price list and comparing the words in the ASCII string describing the item scanned to the words describing the items on the currently selected shopping list. If there is a match between any word or words on the ASCII string to any word describing any item on the shopping list, the items from the shopping list having at least one matching word are marked for later display as symbolized by block 212. Block 214 represents the process of displaying all the items from the current shopping list having at least one matching word as a list of all possible matches, and prompting the user to select which item is the item just placed in the basket. Block 216 represents the process of receiving the user selection usually by sensing which item on the list of possible matches has been touched on the touch screen.

Thereafter, processing is vectored to block 94 on FIG. 5. If no match was found in step 212, the processing of block 218 is performed to display a "not found" message. Thereafter processing is vectored to block 96 in FIG. 5.

Figure 13:
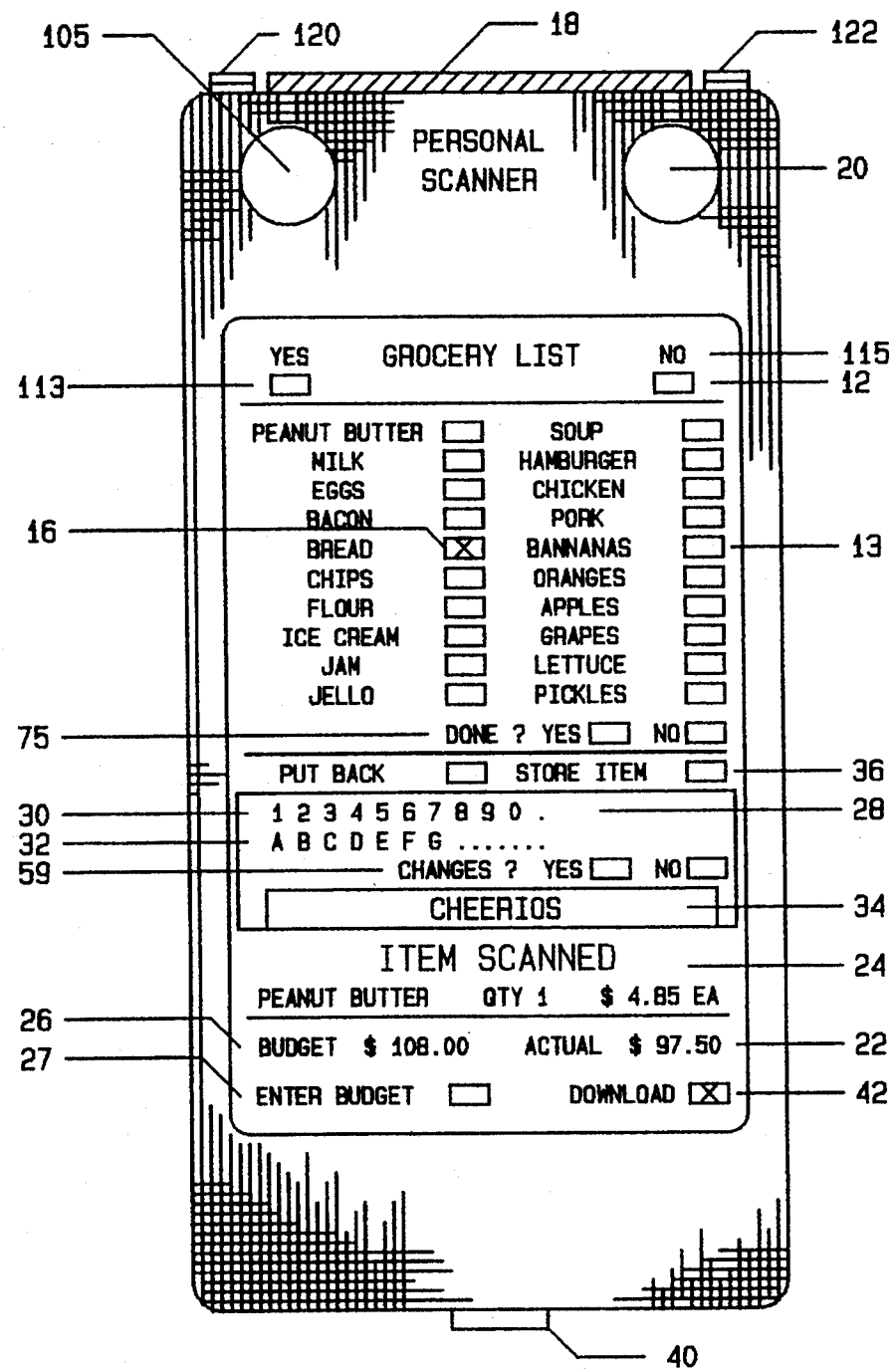
FIG. 13 is a top view of an embodiment of the Personal Scanner TM device using a touchscreen instead of a light pen for selection processes and user input.

FIG. 13 shows a plan view of an embodiment of the device using a touchscreen instead of the light pen 10 shown in FIG. 1. All other functionality is the same as for the embodiments described herein.

Figure 14:
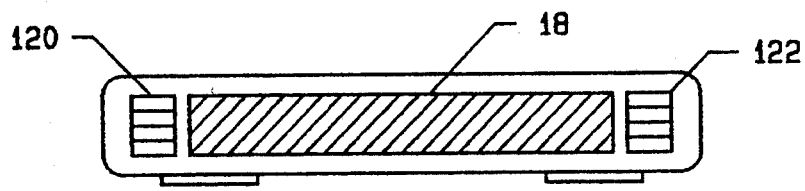
FIG. 14 is an end view of the embodiment shown in FIG. 13.

FIG. 14 is an end view of the embodiment shown in FIG. 13.

Figure 15:
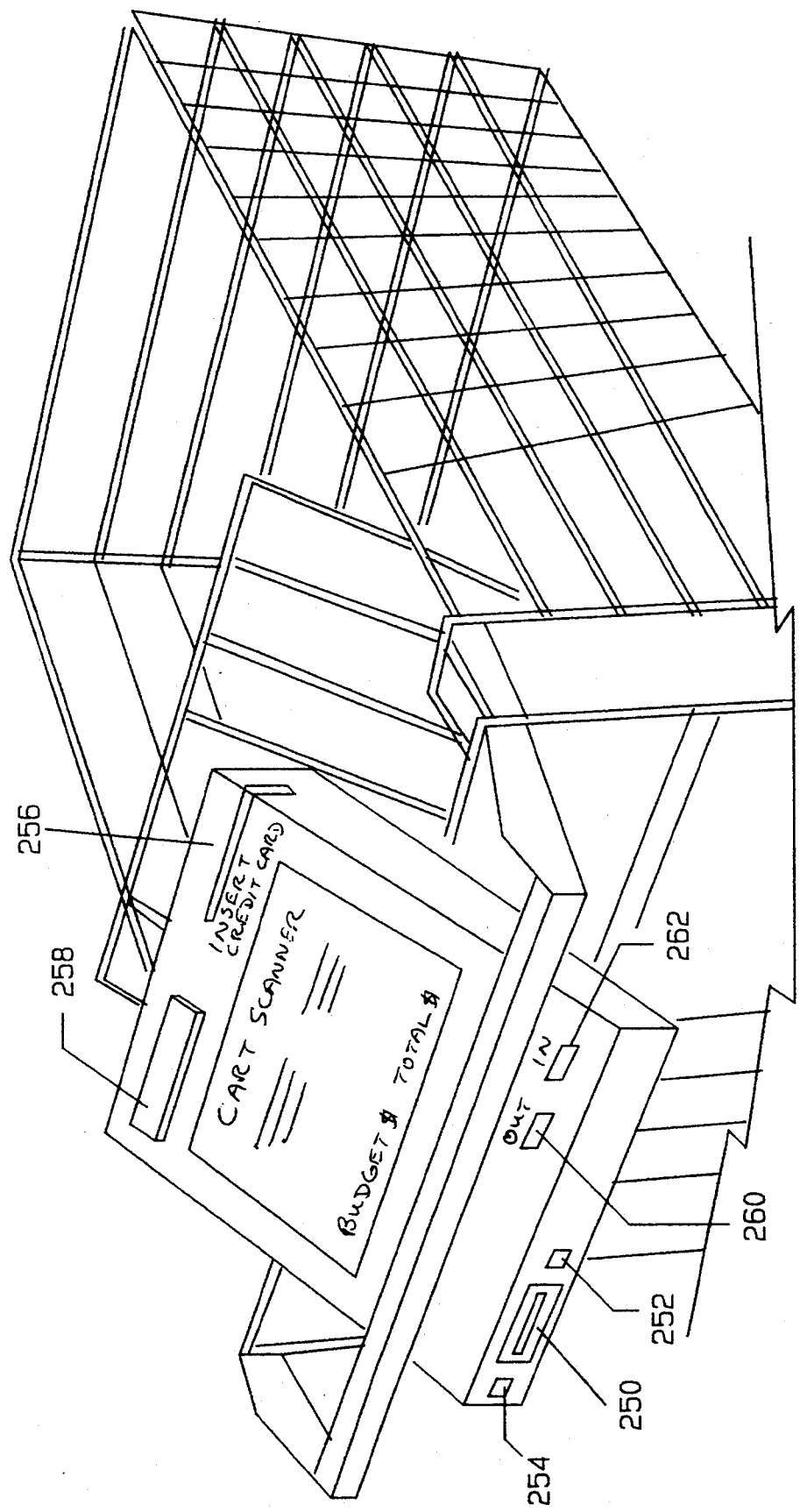
FIG. 15 is a perspective view of a version of the Personal Scanner TM device for use in permanent mounting on a shopping cart for users who do not own their own devices.

Referring to FIG. 15, there is shown a perspective view of a shopping cart mounted version of the Personal Scanner TM device. This embodiment is useful for users who do not own their own Personal Scanner TM devices. The embodiments shown in FIG. 15 uses a touchscreen for user input, but any other pointing device or other method of receiving user input would also suffice to practice the invention. The scanning window is shown at 250 and two D.C. electromagnets for deactivating security strips are shown at 254 and 252. A slot 256 for inserting a credit card into an integrated credit card reader 45 is shown although this is an optional feature and can be deleted in some embodiments. A scan button 258 is pushed by the user when an item has been placed in front of the scanning window for scanning. OUT and IN buttons 260 and 262 are used by the user to download scanned data to the store computer and to download the store price list and coupon list, respectively.

Although the invention has been disclosed in terms of the preferred and alternative embodiments detailed herein, those skilled in the art will appreciate many possible alternatives of doing the same functions described herein. All such alternatives are intended to be included within the scope of the claims appended hereto.

What is claimed is:

1. An barcode scanning apparatus for aiding a shopper, comprising:
   memory for storing a computer program and data:
   a processing means coupled to said memory and capable of executing said computer program;
   display/user input means coupled to said processing means for displaying data received from said processing means and for receiving user input data and transmitting said user input data to said processing means;
   communication means coupled to said processing means for allowing bidirectional transfer of data into and out said processing means;
   barcode reading means coupled to said processing means for scanning barcodes and conveding each barcode to the corresponding string of characters encoded within said barcode which can be stored by said processing means;
   a software program(s) stored in said memory for execution by said processing means comprising:
   means for storing one or more shopping list(s) and for displaying a selectable one of said shopping list(s) as the active shopping list;
   means for receiving a command to scan an item and for causing said processing means to issue a command to said barcode reading means to cause a barcode associated with said item to be read and to receive and store the string of characters generated by said barcode reading means as a result of scanning said barcode, and for causing said string of characters to be compared to the entries of said displayed shopping list, and for causing said processing means to alter the display of any item on said shopping list which has a description matching an item on said shopping list, said alteration of said display for the purpose of indicating that said item has been scanned;

means for downloading scanned data to another computer coupled to said processing means through said communication means.

2. The apparatus of claim 1 wherein said software program further comprises means for downloading a current price list by causing said processing means to log onto another computer through said communication means and downloading whatever price list is current at the time for items in a store which is stored in said other computer.

3. The apparatus of claim 2 wherein said software program includes means for comparing a selected price list to one or more other price lists stored in said memory, and for displaying item(s) that have risen in price and/or items that have fallen in price.

4. The apparatus of claim 3 wherein said means for comparing displays items that have risen in price differently than items which have fallen in price.

5. The apparatus of claim 2 wherein said software program includes means for receiving user input regarding a desired budget and for displaying the desired budget as the desired maximum expenditure on said display/user input means.

6. The apparatus of claim 2 wherein said software program includes means coupled to barcode reading means and to said display/user input means, for extracting price data from said price list for each item scanned by said barcode reading means, and for keeping a running total of expenditure corresponding to the sum of the prices of all items scanned, and for displaying said running total.

7. The apparatus of claim 6 wherein said software program includes means for receiving input from a user indicating when said user is done shopping, and for comparing the list of items scanned to said active shopping list and for altering the display on said display/user input means of said shopping list so as to draw attention to any forgotten items which are on said active shopping list but which have not been scanned.

8. The apparatus of claim 6 wherein said means for downloading a shopping list further comprises means for downloading a current coupon savings or discount list from another computer coupled to said processing means via said communication means and for storing said coupon list in said memory, said means for downloading a current coupon savings or discount list also coupled to said barcode reading means such that whenever an item is scanned, a product identification encoded in said string of characters decoded by said barcode reading means is compared to said coupon list, and if a match is found, for extracting the coupon savings or discount of the matching coupon and automatically deducting the coupon savings or discount from the coupon matching the item scanned from the current price of the item extracted from said price list and adding the result to said running total of the cost of all items scanned.

9. The apparatus of claim 6 wherein said software program further comprises means coupled to said processing means and to display/user input means, for receiving and storing credit card data from one or more credit cards, and for receiving a user selection, entered via said display/user input means, of a particular one of said credit cards for use in purchasing the items scanned by said barcode scanning means and for downloading said selected credit card data and said running total of all items scanned by said barcode scanning means to another computer coupled to said processing means via said communication means for purposes of paying for the items scanned by said barcode scanning means.

10. The apparatus of claim 1 wherein said communication means is an infrared transceiver local area network interface and a suitable driver program therefor stored in said memory.

11. The apparatus of claim 1 wherein said communication means includes a modem and a suitable communication program stored in said memory.

12. The apparatus of claim 1 wherein said means for storing one or more shopping lists includes means for creating custom shopping lists wherein the user can enter new items on or delete items from an existing shopping list, or create an entirely new shopping list.

13. The apparatus of claim 1 wherein said display/user input means is a touchscreen including means for transferring data to said processing means indicating user selections based upon where on said touchscreen said user touched a displayed item or selection alternative.

14. The apparatus of claim 1 wherein said display/user input means is a touchscreen including means for transferring data to said processing means indicating user selections based upon where on said touchscreen said user touched a displayed item or selection alternative, and wherein said means for storing one or more shopping lists includes means for creating custom shopping lists wherein the user can enter new items on an existing shopping list by touching an item on a displayed list of items from a database of available items, or delete items on an existing shopping list by touching the item on said shopping list displayed on said touchscreen.

15. The apparatus of claim 1 wherein said barcode scanning apparatus has a window therein through which light from barcodes to be scanned enters the device, and wherein items to be scanned have thereon magnetic security strips which are used with magnetic detectors at the store exits to detect shoplifting violations, and wherein said barcode scanning apparatus further comprises two direct current electromagnets mounted adjacent said window on said barcode scanning apparatus so as to generate a nonalternating magnetic field when said processing means receives a command from said shopper to scan a barcode affixed to an item, said nonalternating magnetic field deactivating said magnetic security strip when said magnetic security strip has been enveloped by said nonalternating magnetic field during the barcode scanning process.

16. An apparatus for aiding a shopper, comprising:
a barcode scanning device mounted on said shopping cart comprising:
a memory for storing a computer program and data;
a processor capable of executing a computer program;
display/user input device coupled to said processor for displaying data received from said processor and for receiving user input data and transmitting said data to said processor;
modem/local area network interface circuit coupled to said processor for allowing bidirectional transfer of data into and out said processor to another computer via phone lines or local area network connections;

a barcode reading device coupled to said processor for scanning barcodes and converting each barcode to the corresponding string of characters encoded within said barcode which can be stored and displayed by said processor;

a software program(s) in execution by said processor comprising:

a routine for storing one or more shopping list(s) and for displaying a selectable one of said shopping list(s) as the active shopping list on said display/user input device;

a comparison routine for receiving a command to scan an item and for causing said processor to issue a command to said barcode reading device to cause a barcode associated with said item to be read and to receive and store the string of characters generated by said barcode reading device as a result of scanning said barcode, and for causing said string of characters to be compared to the entries of said displayed shopping list, and for causing said processor to alter the display of any item on said shopping list which has a description at least partially matching an item on said shopping list, said alteration of said display for the purpose of indicating that said item has been scanned;

a routine for downloading scanned data to another computer coupled to said processor through said modem/local area network interface circuit.

17. The apparatus of claim 16 wherein items to be scanned have mounted thereon magnetic security strips which are used with magnetic detectors at the store exits to detect shoplifting violations, and wherein said apparatus further comprises two direct current electromagnets mounted on said apparatus so as to generate a nonalternating magnetic field when said processor receives a command from said shopper to scan a barcode affixed to an item, said nonalternating magnetic field deactivating said magnetic security strip when said magnetic security strip has been enveloped by said nonalternating magnetic field during the barcode scanning process.

18. The apparatus of claim 16 further comprising a shopping cart to which said barcode scanning device is mounted, and wherein said comparison routine includes means for comparing the string of characters identifying a scanned product decoded by said barcode reading device to the currently displayed shopping list, and, if any word of the product identification string matches any word of an entry on said shopping list, for displaying on said display/user input device all the possible matches having the matching word therein in a list of items having that word therein downloaded from another computer coupled to said processor by said modem/local area network interface device and for receiving a user selection of an item from said list entered via said display/user input device, and for extracting the price of said selected item from said price list and adding said price to a running total price for all items which have been scanned and for displaying the result on said display/user input device.

19. An apparatus for aiding a shopper, comprising:

a memory for storing a computer program and data;

a microprocessor coupled to said memory, and capable of executing said computer program;

a touchscreen coupled to said microprocessor for displaying data received from said microprocessor and relaying data entered by a user to said microprocessor;

an communication means coupled to said microprocessor for allowing bidirectional transfer of data into and out said microprocessor;

a barcode reader coupled to said microprocessor for scanning barcodes and converting each barcode to the corresponding string of characters encoded within said barcode which can be stored and displayed by said microprocessor;

a software program(s) in execution by said microprocessor comprising:

means for storing one or more shopping list(s) in said memory and for displaying on said touchscreen a selectable one of said shopping list(s) as the active shopping list;

means for downloading from another computer storing current price list for items available for purchase in a store, said downloading carried out via said communication means, and for storing in said memory said current price list downloaded from said other computer and also for storing in said memory a plurality of other price lists from other stores or older prices lists from the store to be shopped, and for comparing the prices on said current price list with a selectable one or more of said other price lists stored in said memory;

means for receiving a command to scan an item and for causing said microprocessor to issue a command to said charge coupled device barcode reader to cause a barcode associated with said item to be read and to receive and store the string of characters generated by said charge coupled device barcode reader as a result of scanning said barcode, and for causing said string of characters to be compared to the entries of said displayed shopping list, and for causing said microprocessor to alter the display on said touchscreen of any item on said displayed shopping list which has a description matching an item on said shopping list, said alteration of said display for the purpose of indicating that said item has been scanned, and for extracting the price of the matching item from said price list and adding it to a running total of items scanned;

means for downloading scanned product identification data from the barcodes of items which have been selected for purchase and scanned and said running total to another computer coupled to said microprocessor through said communication means;

means for receiving and storing credit card data for one or more credit cards, and for receiving a user selection of a particular one of said credit cards for use in purchasing the scanned items and downloading said selected credit card data to another computer via said communication means.

20. The apparatus of claim 19 wherein said barcode reader is a charge coupled device class and wherein said communication means is an infrared transceiver local area network interface.

21. The apparatus of claim 19 wherein items to be scanned have thereon magnetic security strips which are used with magnetic detectors at the store exits to detect shoplifting violations, and wherein said apparatus further comprises two direct current electromagnets mounted on said apparatus so as to generate a nonalternating magnetic field when said processor receives a command from said shopper to scan a barcode affixed to an item, said nonalternating magnetic field deactivating said magnetic security strip when said magnetic security strip has been enveloped by said nonalternating magnetic field during the barcode scanning process.

22. The apparatus of claim 19 wherein items to be scanned have thereon magnetic security strips which are used with magnetic detectors at the store exits to detect shoplifting violations, and wherein said apparatus further comprises two permanent magnets mounted on said apparatus so as to generate a nonalternating magnetic field which deactivates said magnetic security strip when said magnetic security strip has been enveloped by said nonalternating magnetic field at least once.

* * * * *